March 7, 1950          D. R. REED          2,499,879
TRACTOR HITCH
Filed Feb. 28, 1947          2 Sheets-Sheet 2
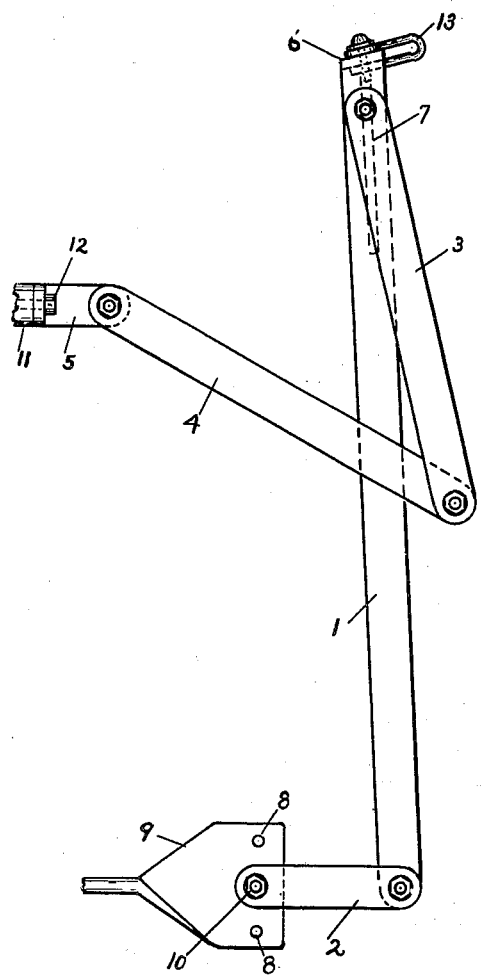
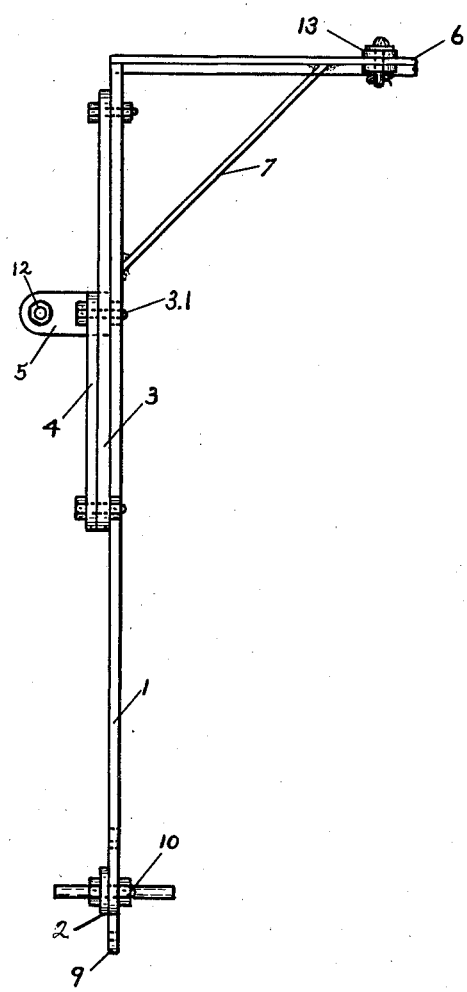
INVENTOR.
Dewey R. Reed,
BY Bush & Bush,
His Attorneys.

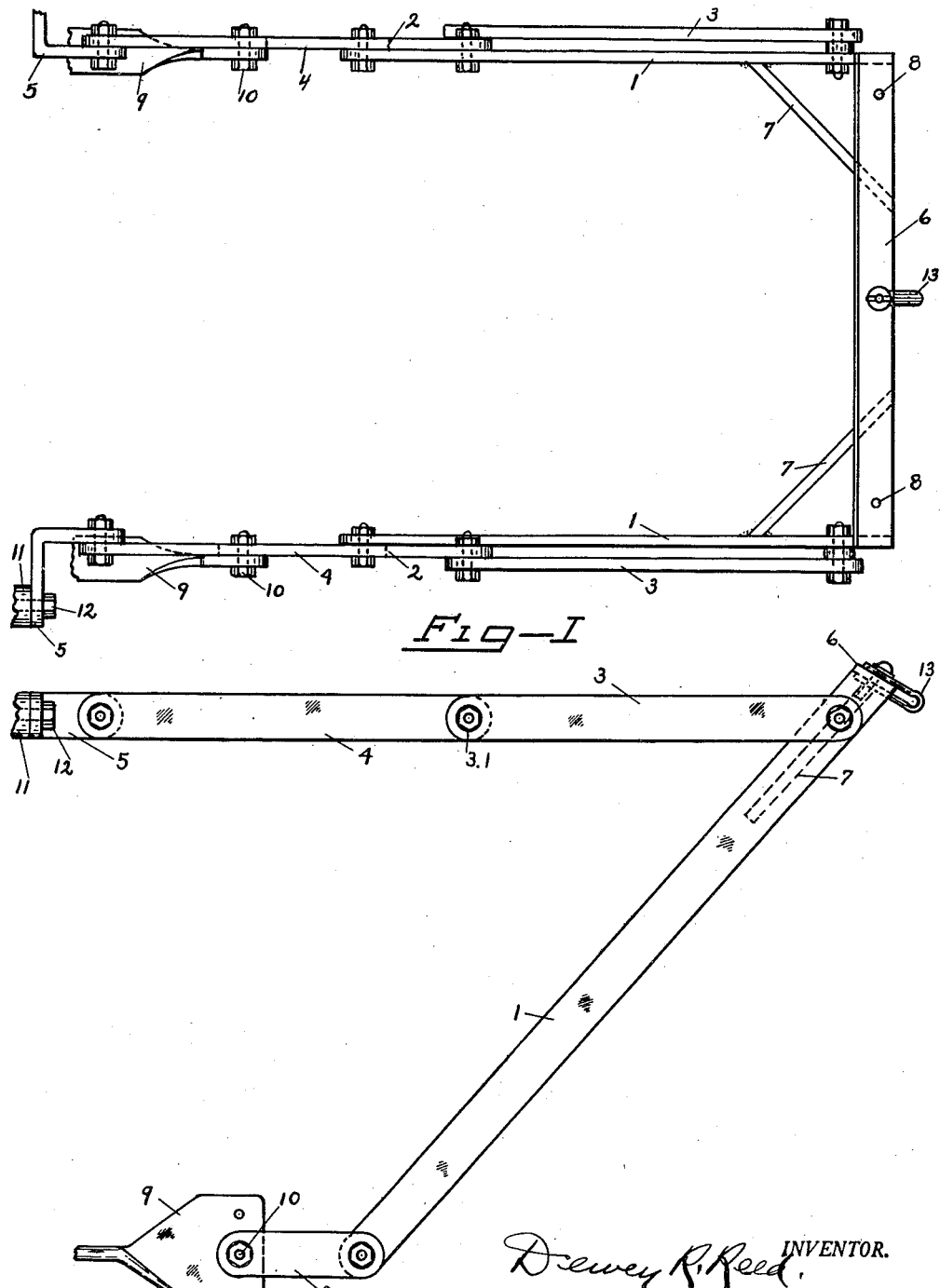

Patented Mar. 7, 1950

2,499,879

UNITED STATES PATENT OFFICE 2,499,879

TRACTOR HITCH

Dewey R. Reed, Woodhull, Ill.

Application February 28, 1947, Serial No. 731,650

4 Claims. (Cl. 280—33.44)

My invention relates to an improvement in tractor hitches and the objects of my invention are to provide a simple, strong attachment for tractors which will draw a toothed harrow clear of the rear wheels and in such a way that the evener will be lifted high enough above the surface of the ground to prevent dragging thereof and to avoid the accumulation of clods, corn roots, and debris which would increase the load and impair the action of the tractor and harrow; to provide such an attachment which can be readily folded up when not in use so as to be entirely out of the way of the takeoff shaft and other attachments of the tractor, and which can be easily and readily placed in operative position.

I attain these objects by the means illustrated in the accompanying drawings, in which—

Figure 1 is a plan view of my hitch in operative position;

Figure 2 is a side elevation of my hitch in operative position;

Figure 3 is a side elevation of my hitch in folded position;

Figure 4 is a fractional view of my hitch in folded position.

Similar numerals refer to similar parts throughout the several views.

My hitch comprises a U-shaped frame with sidebars 1 and a crossbar 6 either formed integral or united by spot-welding or other suitable means and it may have diagonal braces 7 spot-welded or otherwise united thereto.

The sidebars 1 are pivotally united at their lower or inner ends to short bars 2 the inner ends of which may be united to a suitable draft bar 9 extending rearwardly from the tractor frame, by bolts 10 or other suitable means.

Near the outer ends of the bars 1, the outer ends of link-bars 3 are pivotally united to the bars 1 and the inner ends of the link-bars are pivotally united to the outer ends of bars 4, the inner ends of which are pivotally united to brackets 5. The brackets 5 are rigidly united to suitable bosses 11 preferably formed integral with the rear axle housing of the tractor and may be secured thereto by stud-bolts 12 or other suitable means. The draftbar of a tractor for agricultural implements is ordinarily located lower than the rear axle of the tractor. In my hitch the bosses 11 and brackets 5, while they may be formed integral with the rear axle housing, are located above the axle so that the link bars 3 and 4 when in horizontal position extend rearwardly at a substantial height, preferably 15 to 18 inches, higher than the draft-bar.

The crossbar 6 may be provided with a plurality of holes or bores 8 in which a clevis 13 may be secured to carry the draft chain or draft bar of the harrow, as shown in Figure 2.

The bars 1 are made of sufficient length so that the crossbar 6 when in operative position will extend somewhat to the rear of the rear tractor wheels so as to permit turning approximately at right angles without the draft chain dragging upon the tires of the rear wheels.

When not in operation, the U-frame composed of side bars 1—1 and crossbar 6 may be manually moved into upright or vertical position as shown in Figure 3 and the link-bars 3 and bars 4 will act to retain it in such position.

When it is desired to put it in operative position, the bars 4 and link-bars 3 are raised to the horizontal and the crossbar 6 extended to the rear, where the draft rigging of the harrow may be attached by a clevis 13 or by a hook or other suitable part.

In the operation of my hitch, the lower ends of the U-frame are secured to an extension 9 of the draftbar of the tractor or the tractor frame. The bracket 5 is fastened to a suitable boss 11 preferably formed integral with the rear axle housing of the tractor. The U-frame is then moved into the angular position shown in Figure 2 and the link-bars 3 and 4 are extended to the rear in horizontal position so as to hold the upper end of the U-frame at a point substantially above the ground level. The harrow may then be attached to the crossbar 6 by the draft chain commonly used for attaching harrows, which chain may be passed through or secured to the clevis 13 or may be provided with a hook or pin that can be inserted in one of the bores 8.

The pull of the harrow and the support of the link-bars 3 and 4 will hold the U-frame in the position shown in Figure 2. The draft rigging of the harrow and the length of the draft chain will be so proportioned that the evener of the harrow will be held far enough above the ground level to prevent piling up of clods, corn roots, etc., in front of the evener.

When the hitch is not attached to a harrow, the hitch may be manually folded up into the position shown in Figure 3.

Various modifications may be made in the size, proportions and arrangements of the different parts without departing from the spirit of my invention and I do not limit my claims to the precise forms shown in the drawings.

I claim:

1. In a hitching appliance for tractors, a pair of rigid sidebars, their inner ends removably attachable to the drawbar of a tractor and their outer ends united by a crossbar, a pair of foldable bars comprising link-bars having their outer ends pivoted to the upper ends of the rigid bars near the crossbar and their inner ends pivotally united to the outer ends of a second pair of link-bars having their inner ends pivotally united to brackets rigidly secured to suitable bosses formed upon the rear axle housing of the tractor, whereby the rigid bars may be secured either in extended position with the crossbar at fixed distances from the tractor and above the ground or in a folded position close to the tractor and approximately vertical.

2. A hitching appliance for tractors as described in claim 1, and means formed in the crossbar for the attachment at a predetermined height above the ground of a clevis to which the draft rigging of an agricultural implement to be drawn by the tractor may be attached.

3. In a hitching appliance for tractors, a pair of rigid sidebars, their inner ends removably attachable to the drawbar of a tractor and their outer ends united by a crossbar, a pair of foldable bars comprising link-bars having their outer ends pivoted to the upper ends of the rigid bars near the crossbar and their inner ends pivotally united to the outer ends of a second pair of link-bars having their inner ends pivotally united to brackets rigidly secured to suitable bosses formed upon the rear axle housing of the tractor at a substantial height above the draftbar, whereby the rigid bars may be secured either in extended position with the crossbar at fixed distances from the tractor and above the ground or in a folded position close to the tractor and approximately vertical.

4. In a hitching appliance for tractors, a pair of rigid sidebars, their inner ends removably attachable to the drawbar of a tractor and their outer ends united by a crossbar, a pair of foldable bars comprising link-bars having their outer ends pivoted to the upper ends of the rigid bars near the crossbar and their inner ends pivotally united to the outer ends of a second pair of link-bars having their inner ends pivotally united to brackets rigidly secured to suitable bosses formed upon the rear axle housing of the tractor, said bosses being secured to the housing at a height of approximately 15 inches above the draftbar, whereby the rigid bars may be secured either in extended position with the crossbar at fixed distances from the tractor and above the ground or in a folded position close to the tractor and approximately vertical.

DEWEY R. REED.

REFERENCES CITED

The following references are of record in the file of this patent:

UNITED STATES PATENTS

| Number | Name | Date |
|---|---|---|
| 1,374,271 | Alden | Apr. 12, 1921 |
| 1,383,716 | Goldberger | July 5, 1921 |
| 1,636,276 | Benjamin et al. | July 19, 1927 |